INVENTORS
LEONARD J. VILUTIS
ADOLF H. HULLER

BY
ATTORNEYS

United States Patent Office 3,411,968
Patented Nov. 19, 1968

3,411,968
METHOD OF INCORPORATING A TEAR STRING IN A THERMOPLASTIC WEB
Leonard J. Vilutis, Chicago, and Adolf H. Huller, Chicago Heights, Ill., assignors to The Dow Chemical Company, Midland, Mich., a corporation of Delaware
Filed Oct. 26, 1964, Ser. No. 406,336
8 Claims. (Cl. 156—176)

ABSTRACT OF THE DISCLOSURE

Apparatus and method for incorporating a tear string in a web containing a heat sealable thermoplastic resin surface, which web is employed in the formation of a container wherein the thermoplastic resin surface forms the inner side of the container; the method comprising positioning a tear string in contact with the thermoplastic resin surface and heating a narrow strip of the web to above the softening point of the thermoplastic resin and thereafter applying sufficient pressure to embed the tear string in the heated strip of the thermoplastic resin surface.

---

Figure 1:
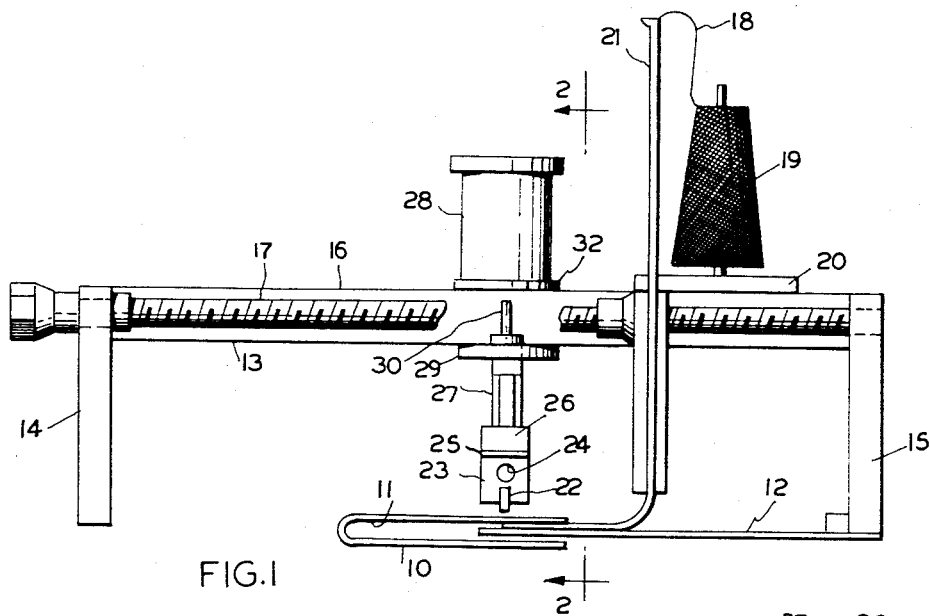

This invention relates to a method of producing containers, preferably pouch type containers, which contain a tear string opening device and more particularly to a method of incorporating the tear string opening device in containers employing thermoplastic resin webs or webs coated with thermoplastic resins.

The methods heretofore employed for incorporating a tear string opening device in containers employing plastic webs or plastic coated webs have generally involved the inclusion of the tear string when the web is formed. Thus, in the extrusion of the web or the extrusion-coating of the web, the thermoplastic resin, in the form of a molten thermoplastic sheet, is continuously fed into the nip of two rolls where it is either drawn or drawn and laminated to the substrate as a result of the pressure applied by the rolls and the molten, heat sealable state of the material. The tear string to be incorporated is also fed into the nip of the rolls such that the tear string contacts the thermoplastic resin and thereby is attached to the web. The web formed in this manner is then wound up and employed in the form of roll stock in a variety of packaging machines which automatically fold or otherwise form, fill and seal the container made from the web. In order to readily use the tear string to open the package, the package is notched in the vicinity of the tear string.

This method of incorporating the tear string in a container is subject to a number of disadvantages. Thus, the contact time of the tear string with the web when such is under pressure and in the molten heat sealable state is extremely short and thus does not necessarily result in the proper bonding of the tear string to the web. Furthermore, since the entire thermoplastic resin sheet is in a molten, fluid state, there is a tendency of the thermoplastic resin to flow away from the tear string rather than bond to the tear string and this too can lead to poor bonding of the tear string to the thermoplastic resin sheet or coating. Additional disadvantages result when the web is wound up as roll stock. A build-up is caused in the roll in the area in which the string was inserted resulting in telescoping of the rolls during handling and shipping. Although such telescoping can be minimized by weaving the tear string back and forth during its inclusion in the web, the resulting oscillation of the tear string precludes mechanical notching of the package at the string location. Additionally, when the described method is employed to form edge sealed pouches from thin thermoplastic webs and particularly from extrusion coated webs which contain only a thin coating of the resin, it is difficult to obtain an effective impervious side seal at the location of the tear string. Thus, the resin on cooling tends to shrink away from the tear string leaving voids in the area where the tear string is attached to the web. On side sealing the web these voids are not always filled with resin since the tear string absorbs the pressure applied to the contacting webs during the sealing operation and prevents the flow of resin into the voids. These voids therefore can prevent the contents from being properly sealed off causing loss of bouquet and aroma in delicate foods or loss of fluid contents. Air may, as a result thereof, penetrate the container causing the contents to become stale or even spoil.

It is therefore the principal object of the present invention to provide an improved method of incorporating tear string opening devices in containers employing flexible webs which avoid the above described deficiencies of prior art methods. Other objects will become apparent hereinafter.

The objects of the present invention are accomplished by a method which comprises incorporating a tear string in a web containing at least one heat sealable thermoplastic resin surface, which web is employed in the formation of a container wherein the thermoplastic resin surface forms the inner side of such container, by positioning a tear string on said web in contact with the thermoplastic resin surface, heating a narrow strip of said web in contact with said tear string to above the softening point of the thermoplastic resin, applying sufficient pressure to said strip to embed said tear string in said strip and, preferably, thereafter forming such edge seals as contain such tear string before the thermoplastic resin cools below its softening point.

The described method of including the tear string opening device is used in the formation of containers employing thermoplastic resin webs or thermoplastic coated webs which are flexible or semi-flexible. The thermoplastic resins useful in the formation of such webs are resins which are non-tacky and solid at use temperatures and fluid and tacky or heat sealable at elevated temperatures, i.e., at temperatures above the softening point or melting point of the resin. Examples of resins useful in the forming of such webs are in particular polyolefins such as ethylene polymers, propylene polymers, styrene polymers and copolymer of such monomers, although other thermoplastic resins such as vinyl halide or vinylidene halide polymers can also be employed. Laminated webs may be formed by extrusion coating polyolefins onto such substrates as paper, foil, cellophane, polyester films and similar materials.

The tear string opening device formed by the method of the present invention is preferably employed in pouch type containers formed from two superimposed sheets of the web heat sealed at one or more edges or folded and heat sealed at the remaining edges. The construction of such containers is well known in the art.

The tear string employed in the present invention can be of any suitable composition such as cotton or a synthetic material (rayon, nylon, etc.). The tear string can be a single filament or a yarn of many filaments. The diameter of the tear string is selected to make the tear string strong enough to cut through the web without breaking.

Figure 2:
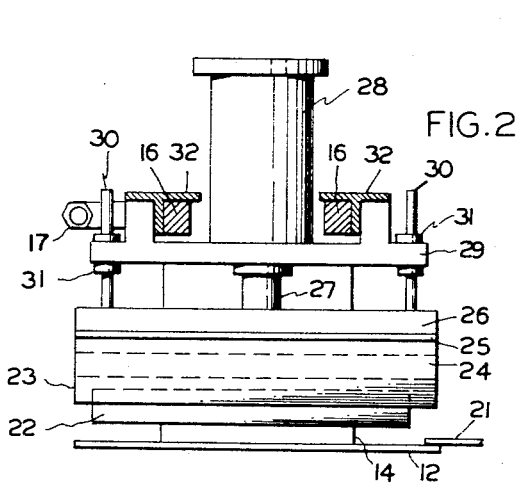
Figure 3:
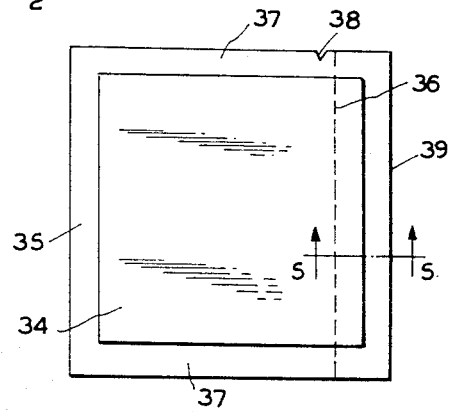

The mehod of the present invention is further illustrated by following description and accompanying drawing in which:

FIGURE 1 is a side view of the type of apparatus suitable in carrying out the method of the present invention.
FIGURE 2 is a section along line 2—2 of FIGURE 1.
FIGURE 3 is a plan view of a pouch containing the tear string construction of the present invention in which the pouch is produced by edge-sealing two superimposed separate sheets.

Figure 4:
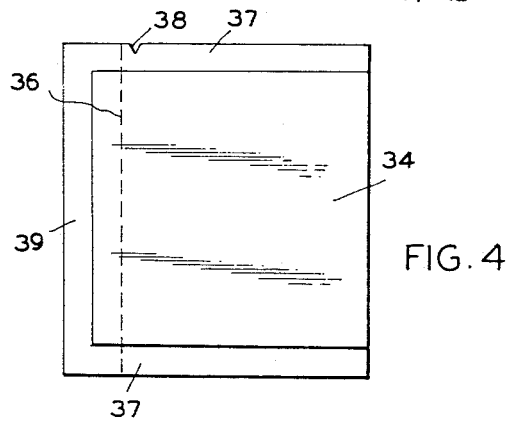
Figure 5:
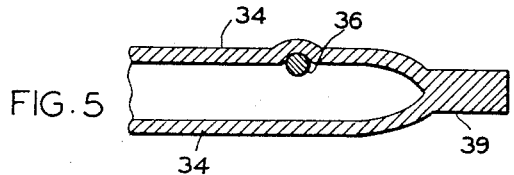

FIGURE 4 is a plan view of a modified pouch produced by edge-sealing superimposed sheets obtained by folding a single web; and FIGURE 5 is a sectional view on an enlarged scale of FIGURE 3 in the plane of line 5—5.

Referring now to FIGURES 1 and 2, a folded thermoplastic web 10 having a heat sealable thermoplastic resin surface 11 is placed over buffer plate 12, attached to frame 13 comprising principally end supports 14 and 15 and guide rails 16. A tear string 18 from bobbin 19 mounted on movable platform 20, resting on guide rails 16, is passed through guide tube 21, attached to platform 20, between the two heat sealable surfaces of web 10 and above buffer plate 12. The tear string is pulled taut across buffer plate 12 and aligned with heat sealing bar 22 by means of adjusting screw 17. Buffer plate 12 is preferably coated with a material which does not adhere or stick to the softened thermoplastic resin material of the web, such as polytetrafluoroethylene.

The width of the heat seal bar 22 determines the width of the strip of thermoplastic resin heated to above the softening temperature of the resin where it is heat sealable. It is preferred to heat as narrow a strip as possible to avoid unnecessary flow of the softened resin. The heating bar employed should however be wide enough to allow the tear string to become embedded in the resin.

The heat seal bar 22 is embedded in heating block 23 which is heated by an electric cartridge heater 24. The temperature employed will depend on the particular thermoplastic resin of the web, and the nature of the web. The temperature should be high enough to rapidly heat the strip to above the softening point of the resin but not so high as to make the resin too fluid. In general, temperatures of 10° to 50° F. above the softening point or melting point of the resin are employed.

Heating block 23 is attached to the pressure mechanism by means of insulating layer 25 and support 26. The heat sealing bar is lowered onto the thermoplastic web 10 and the aligned tear string 18 by means of piston 27 which is activated by compressed air in air cylinder 28 attached to platform 29. Sealing bar guides 30 slidingly connected to platform 29 by means of nylon bushings 31 and seated in support 26 assure accurate placing of the heat seal bar 22 on top of the tear string as the bar is lowered. Platform 29 is supported on guide rails 16 by means of T-shaped wedges 32 removably attached to platform 29 thus allowing adjustment of the sealing bar position.

The pressure applied during the embedding of the tear string will vary depending on the nature of the web and the temperature to which the web is heated, and should cause the tear string to become embedded in the resin heated. It should not be so high, however, as to cause the tear string to completely cut through the thermoplastic resin. In view of the wide applicability of the method of the present invention, optimum conditions will vary considerably. Thus, employing a 1 mil polyethylene web, and a nylon tear string, the heat seal bar is maintained at a temperature of 200° to 400° F. while the applied pressure is from 20 to 60 p.s.i. in the operation of the above described equipment.

After the tear string has been embedded in the folded web, the web is moved on to form the side seals of the container. As indicated above, this is preferably carried out immediately after the tear string has been embedded and before the thermoplastic resin at the tear string has cooled to below its softening point. Combining the incorporation of the tear string opening device in this manner with the formation of the side seals assures a void-free side seal at the point where the tear string passes through the side seal.

FIGURES 3, 4 and 5 illustrate the preferred type of containers employing the tear string as incorporated by the method of the present invention. Thus, the preferred type of containers comprises two superimposed flexible webs 34 of generally rectangular shape in which heat sealable thermoplastic resin surfaces contact each other. The edges of the sheet are heat sealed to form fin-type edge seals. In the container of FIGURE 3 all four edges are sealed whereas in the container of FIGURE 4 the edge resulting from the folding of the web is unsealed. The folded web of the container of FIGURE 4 or the two superimposed webs with bottom seal 35 formed of the container of FIGURE 3 are employed in the above described method of embedding tear string 36, which extends across one of the webs and terminates in the side seals 37. As indicated above, it is preferred to immediately thereafter, before the thermoplastic resin has cooled to below the softening point, form side seals 37. Notch 38 is then cut into one of the side seals by mechanical means. The resulting open pouch is then filled and top seal 39 applied to hermetically seal in the contents.

As will be apparent from the foregoing description, the method of the present invention provides a number of advantages over the prior art methods of incorporating the easy opening tear string and is particularly useful in the formation of pouch-like, flexible containers widely employed in the packaging of foods. Thus, the tear string can be incorporated into the folded web just prior to the forming of the container. This avoids the telescoping of roll stock as is obtained when the tear string is incorporated during the formation or coating of the web. By heating just a narrow strip of the web, the thermoplastic resin is prevented from flowing away from the tear string and is forced to bond to the tear string which is thereby properly imbeded in the resin. The location of the tear string can be accurately positioned and remains constant such that mechanical notching of the container can be accomplished. The combination of the tear string application with the formation of the edge seals without cooling the thermoplastic resin to below its softening point, furthermore assures a tight seal particularly where the web comprises or contains only a thin layer of the thermoplastic resin. The method and described apparatus are readily incorporated in automatic container forming operations.

The foregoing detailed description has been given for a better understanding of the principles of the invention and it is not intended to limit the scope of the invention thereto except as defined in the appended claims, modifications of the specific features illustrated being obvious to those skilled in the art.

We claim:

1. The method of incorporating a tear string in a web containing at least one heat sealable thermoplastic resin surface, which web is employed in the formation of a container wherein the thermoplastic resin surface forms the inner side of said container, which comprises positioning a tear string in contact with the thermoplastic resin surface, and heating a narrow strip of said web to above the softening point of the thermoplastic resin and thereafter applying sufficient pressure to embed said tear string in the heated strip of said thermoplastic resin surface.

2. The method of claim 1 wherein said web is of generally rectangular shape and wherein said tear string extends to the side edges of said web.

3. The method of claim 1 wherein said web comprises a heat sealable thermoplastic resin.

4. The method of claim 1 wherein said web is a polyolefin film.

5. The method of claim 2 wherein the side edges of the web containing said tear string are sealed before the heated narrow strip of said web in the vicinity of the tear string cools to below its softening point.

6. A method of producing a container from a first web containing at least one heat sealable thermoplastic resin surface, wherein the thermoplastic resin surface forms the inner side of said container, which comprises positioning a tear string in contact with the thermoplastic resin surface, and heating a narrow strip of said web to above the softening point of the thermoplastic resin and thereafter applying sufficient pressure to embed said tear string in the heated strip of said thermoplastic resin surface and then forming side seals between the side of said first web having the string and a second web before said strip cools below its softening point.

7. The method of claim 6 further comprising the steps of filling and hermetically sealing said container.

8. The method of claim 1 wherein said tear string is a yarn of a plurality of filaments.

References Cited

UNITED STATES PATENTS

| | | | |
|---|---|---|---|
| 3,226,282 | 12/1965 | Jackson | 156—519 |
| 3,298,891 | 1/1967 | Beck | 156—519 |
| 2,335,159 | 11/1943 | Salfisberg. | |
| 2,683,401 | 7/1954 | Smith | 156—519 XR |
| 3,283,672 | 11/1966 | Mueller | 156—176 XR |

PHILIP DIER, *Primary Examiner.*

Disclaimer 3,411,968.—*Leonard J. Vilutis*, Chicago, and *Adolf H. Huller*, Chicago Heights, Ill. METHOD OF INCORPORATING A TEAR STRING IN A THERMOPLASTIC WEB. Patent dated Nov. 19, 1968. Disclaimer filed May 25, 1970, by the assignee, *The Dow Chemical Company*.

Hereby enters this disclaimer to claims 1, 2, 3, 4 and 8 of said patent.
[*Official Gazette August 18, 1970.*]